H. INOUE.
PROCESS OF MANUFACTURING ASPHALTIC PLATES AND ASPHALTIC ARTICLES OF A SIMILAR NATURE.
APPLICATION FILED JUNE 23, 1917.

1,304,483.

Patented May 20, 1919.

Heisaburo Inoue,
Inventor,

By Geo. P. Kimmel
Attorney.

UNITED STATES PATENT OFFICE.

HEISABURO INOUE, OF KYOTO, JAPAN, ASSIGNOR TO GOKEN NAKAMURA, OF KOBE, JAPAN.

PROCESS OF MANUFACTURING ASPHALTIC PLATES AND ASPHALTIC ARTICLES OF A SIMILAR NATURE.

1,304,483.         Specification of Letters Patent.     Patented May 20, 1919.

Application filed June 23, 1917. Serial No. 177,196.

*To all whom it may concern:*

Be it known that I, HEISABURO INOUE, a subject of the Emperor of Japan, residing at Kyoto city, Japan, have invented certain new and useful Improvements in Processes of Manufacturing Asphaltic Plates and Asphaltic Articles of a Similar Nature, of which the following is a specification.

My invention relates to the process of manufacturing asphaltic plates and other asphaltic articles of a similar nature by properly mixing petroleum residue with asphalt, fusing the mixture into the form of liquid at a high temperature, pouring said liquefied substance into boxes or molds, made of iron or some other suitable metallic plate covered with tin or some other suitable metal and the inner surface of said boxes or molds being previously coated with mercury, and removing the articles thus formed after setting. According to the nature of articles desired, I may use as a substitute for the above-mentioned mixture fused asphalt mixed with sand, gravel, and the like.

An object of my invention is to obtain strong and durable asphaltic plates and other articles of a similar nature considerably easier and more completely.

Another object of my invention is to obtain practical and artistical asphaltic plates and other articles of a similar nature in any size, shape or design far more economically by saving much of the time and labor required for works of this sort.

A further object of my invention is to obtain strong, durable and practical asphaltic plates combined with cement or concrete slabs to make the same more suitable for special purposes.

Figure 1:
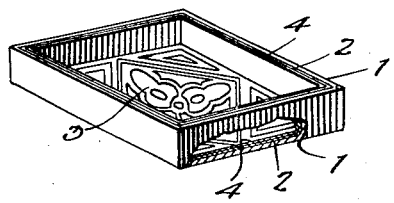
Figure 2:
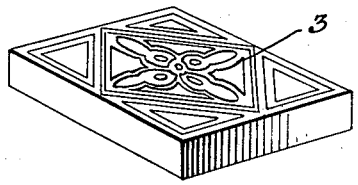
Figure 3:
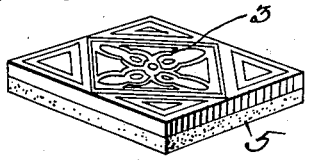
Figure 4:

Other objects and advantages to be derived from the use of my present invention will appear from the following detailed description and the claims taken with an inspection of the accompanying drawing, in which:

Figure 1 is a view showing the box or mold; Fig. 2 is a view showing an asphaltic plate as an example of articles made according to my invention; Fig. 3 is a view showing an asphaltic plate combined with a cement slab; and Fig. 4 is a sectional view of said asphaltic plate combined with a cement slab.

Similar numerals of reference designate like and corresponding parts throughout the several views.

To describe the process of my present invention more fully according to the order of operation:

I make the box or mold, in any size or shape as may be needed (a square box for making asphaltic plates and a round mold for asphaltic pipes to cite an instance), of iron plate 1 covered with tin 2 or some other metal possessing the property of retaining mercury in proper condition and prolonging its usefulness for my present purposes, or of some other metallic plate 1 which can be substituted for iron plate for the present purposes and covered with tin 2 or such other metal, using a plain bottom or any other bottom representing various designs 3 formed by irregularities of surface, and coat or cover the whole inner surface of said box or mold with mercury. Though I have described the making of the box or mold in a special manner as above, I desire that it be understood that I may construct the box or mold with such metallic plate and cover the whole inner surface of the same with amalgam comprising mercury and tin or mercury and such other metal as can be substituted for tin for the present purposes, my spirit of utilizing metallic plate and mercury for facilitating in removing articles manufactured remaining all the same.

I then make a mixture of asphalt and petroleum residue or a mixture of asphalt, petroleum residue, and sand, gravel, asbestos or some other materials, and fusing the mixture thus formed into the form of liquid at about three hundred degrees centigrade, pour the liquefied mixture into the box or mold as prepared above. After setting, I remove the articles manufactured thus from said box or mold, and by this process asphaltic plates and other asphaltic articles, such for instance as asphaltic pipes, can be obtained considerably easier and far more economically, besides being very practical, durable and artistic. I desire that it be understood that I may fuse asphalt first and then mix other materials with said fused mass instead of fusing the mixture of such materials.

To obtain asphaltic plates combined with cement or concrete slabs as shown in Fig. 3 and Fig. 4, I first make cement or concrete slabs with a porous surface and so shaped as to fit the box or mold to be used in connection with the same and keep said slabs in a completely dry state. I then pour the liquefied asphaltic mixture into the box or mold, taking care that ample room is left in the box or mold to allow the cement or concrete slab to be inserted thereinto, and then insert said slab into the box or mold with said porous surface downward in such a way as to make the porous surface closely contact with the upper surface of the asphaltic mixture, thus securely combining these two materials into one piece. After setting, I remove the article manufactured from the box or mold, and in this way asphaltic plates combined with cement or concrete slabs can be made very easily, completely and economically. This class of article is advantageously used when it is desirable to obtain secure attachment.

Having thus fully described my invention, what I claim as new and desire to secure by Letters Patent is:

1. The process of manufacturing asphaltic plates combined with cement or concrete slabs by first pouring fused asphaltic mixture into a box or mold of the class described and then laying such slabs on said molded asphaltic mixture before the same gets cool, substantially as set forth.

2. An improved process of manufacturing asphaltic plates, or the like, consisting in mixing asphalt, petroleum residue, and sand, gravel, asbestos, fusing the mixture, and pouring said fused mixture into a mold having an amalgamated tin covered surface, as and for the purposes specified.

3. The process of manufacturing asphaltic plates combined with cement or concrete slabs, consisting in making the concrete or cement slabs with a porous surface and shaping the same to fit a mold to be used in connection with the same, said slabs being in a completely dry state, pouring liquefied asphaltic mixture into said molds in a hot condition and then inserting said slabs into the molds with said porous surface disposed downward to contact with the upper surface of the asphaltic mixture for combining and afterward removing the same.

4. The process of manufacturing asphaltic plates combined with cement or concrete slabs, consisting in making the concrete or cement slabs with a porous surface and shaping the same to fit a mold to be used in connection with the same, said slabs being in a completely dry state, pouring liquefied asphaltic mixture into said molds in a hot condition and then inserting said slabs into the molds with said porous surface disposed downward to contact with the upper surface of the asphaltic mixture for combining and afterward removing the same, said slab having recesses therein receiving said mixture.

In testimony whereof I affix my signature hereto.

HEISABURO INOUE. [L. S.]